United States Patent
Murray et al.

(10) Patent No.: US 9,282,054 B2
(45) Date of Patent: Mar. 8, 2016

(54) DETERMINING AN ACTIVE MANAGEMENT UPLINK

(71) Applicant: Hewlett-Packard Development Company, L.P., Houston, TX (US)

(72) Inventors: Christopher Murray, Houston, TX (US); Alex Olson, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 41 days.

(21) Appl. No.: 14/447,449

(22) Filed: Jul. 30, 2014

(65) Prior Publication Data
US 2016/0036717 A1    Feb. 4, 2016

(51) Int. Cl.
| | |
|---|---|
| *H04L 12/28* | (2006.01) |
| *H04L 12/911* | (2013.01) |
| *H04L 29/08* | (2006.01) |
| *H04W 8/00* | (2009.01) |
| *H04L 12/24* | (2006.01) |
| *H04W 80/02* | (2009.01) |

(52) U.S. Cl.
CPC ............... *H04L 47/70* (2013.01); *H04L 41/12* (2013.01); *H04L 69/324* (2013.01); *H04W 8/005* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 7,319,664 B2 | 1/2008 | Chen et al. | |
| 7,787,363 B2 | 8/2010 | Yager et al. | |
| 8,358,591 B2 | 1/2013 | Chuang et al. | |
| 2008/0275975 A1* | 11/2008 | Pandey | H04L 49/70 709/223 |
| 2010/0046398 A1 | 2/2010 | Yang et al. | |
| 2013/0058354 A1* | 3/2013 | Casado | H04L 12/4633 370/401 |
| 2015/0188808 A1* | 7/2015 | Ghanwani | H04L 45/42 709/244 |
| 2015/0256405 A1* | 9/2015 | Janardhanan | H04L 41/12 370/255 |

OTHER PUBLICATIONS

Sanyal, Amit, "Dell Networking Solutions for Today and Tomorrow", (Research Paper), Nov. 19, 2013, Melbourne, Australia, 33 pages.

\* cited by examiner

*Primary Examiner* — Duc C Ho
(74) *Attorney, Agent, or Firm* — International IP Law Group, PLLC (57) ABSTRACT

A method and system for determining an active management uplink including adjusting a bridge priority value, based on connectivity conditions, to lower the value of a bridge ID stored in a memory region of a network module. The method and system to also identify a network module as a root network module if it has a lower bridge ID than all other stacked network modules. The bridge ID of a network module may be based on the bridge priority value and a MAC address stored in a memory region of the network module. The system and method to also enable the management uplink port of the root network module to actively manage data between the management network and other stacked network modules.

20 Claims, 9 Drawing Sheets

DETERMINING AN ACTIVE MANAGEMENT UPLINK

BACKGROUND

In a data center, modules for networking such as Ethernet switches or Virtual Connect fabrics are often stacked to allow greater connectivity and redundancy. For example, a pair of switches, each with an uplink, could be "stacked" or redundantly and communicatively connected to another device. However, the stacked modules may require manual identification by a system manager, such as a data center operator. The stacked modules may also require the manual selection of the management uplink port by the operator. This manual process is expensive, time consuming, and is prone to failure. If the management uplink fails, the reconfiguration of the network modules to enable another management uplink must wait until the operator can manually reset it.

BRIEF DESCRIPTION OF THE DRAWINGS

Certain exemplary embodiments are described in the following detailed description and in reference to the drawings, in which.

DETAILED DESCRIPTION

A stacked network node is a fully functional standalone network node that is interconnected to with other network nodes. This collection of interconnected network nodes may operate together with a capacity that is the sum of the individual component nodes, but may still appear to an outside system or network as a single network node. This characteristic of stacked network nodes reduces the complexity needed to use the large number of resources from a pool of nodes as it avoids the need to specifically call or refer to each individual node. However, the stacked nodes have been manually configured to identify which of the stacked network nodes will act as the primary communication point, e.g., the root node for the entire collection of network nodes.

A method and system is disclosed herein that provides, in part, a means for accomplishing the identification of the root node automatically. The automatic configuration of a root node eliminates the need for an operator to manually perform protocols such as spanning tree protocol (STP) or link aggregation control protocol on their network. Instead such protocols may be run automatically without manual configuration commands by an operator.

In examples, management port redundant uplink connections may be assigned automatically. This allows devices to be discovered on the management network without intervention by a network administrator. In some examples, an operator may verify that the cables are connected properly. Linking the automatic assignment of management uplink port connectivity with the root bridge assignment from an automatically run STP protocol allows the assignment of the active management uplink port to be automatic. Further, it allows the assignment of the management uplink port to be independent of which of the stacked nodes is actually running the management software for the collection of stacked network modules.

The automatic determination of the root bridge provides uplink redundancy to the management network. The disclosed system and method may prevent loops between stacked uplinks and the management network when there are multiple network modules connected to the management network. In one example, the management uplinks do not use network spanning tree protocols. The disclosed method and system removes the requirement for the operator to manually configure management uplinks after the network has booted.

Examples may be used with any group of stacked network modules that need automatic connectivity to another network without loops. As used herein, the term "bridge ID" may be a combination of a 16 bit bridge priority value and a 48 bit MAC address that is stored in a physical memory region within the network module. A lower bridge ID value in a network of stacked network modules may indicate a higher chance that the network module will be assigned the root designation. However, in other examples, the conventions of bridge priority value and bridge ID may be reversed.

When the lower bridge priority values and bridge IDs are favored, a default priority of each bridge or network module may be 0xffff. If the network module has determined that the MGMT port is connected to the management network and through other means more fully explained in FIG. 3, items 308-314, then the network module may drop its bridge priority value by a factor of 2. In one example, one factor is defined as 0x1000. If the network module has determined that the MGMT port has a link and verified it is not connected to another network module but the connection is still unknown, the bridge priority may be lowered by a factor of 1.

The root designation may only be given to a network module that has a management port connection. If more than one network module has a valid management port connection and the same bridge priority value, the combination of priority and MAC address, e.g. through a bridge ID, will determine which network module's MGMT uplink port will be enabled. In one instance, the MGMT uplink port will be enabled on the network module that is also the root bridge.

Figure 1A:
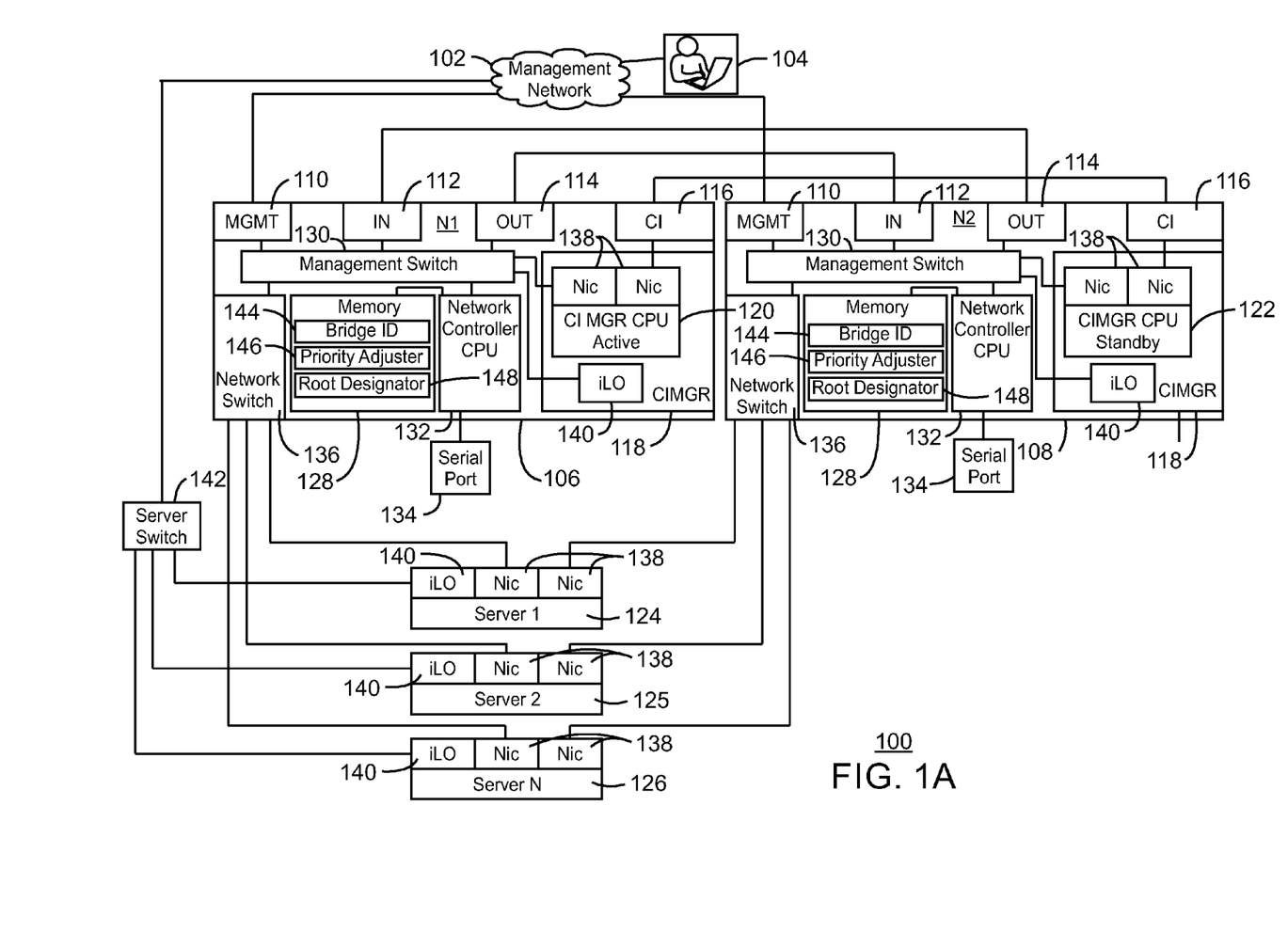
FIGS. 1A and 1B show block diagrams of an example network including stacked network modules.

FIGS. 1A and 1B show block diagrams of an example network including stacked network modules. In FIG. 1A, a management network 102 that may be accessed by a user 104 may provide access to the network modules 106 and 108. Each network module (N1) 106 and (N2) 108 has four external ports: a management (MGMT) uplink port 110, two stacking ports IN 112 and OUT 114, and a cross connect port (CI) 116. The CI port 116 may link converged infrastructure managers (CI MGR) 118 in each network module, N1 106 and N2 108. The connections in this figure, and the following figures, may include an Ethernet connection, an optical link, or any number of other physical or wireless communication links, or any combinations thereof. The CI ports 116 may be used for connecting an active CI MGR to a standby CI MGR. In this example, the CI MGR 118 in N1 106 includes the active CI MGR CPU 120 and N2 108 includes the standby CI MGR CPU 122. Each CPU herein described can be a single core processor, a multi-core processor, a computing cluster, or any number of other configurations.

The connecting CI ports 116 may be used to provide heartbeat information between the two network modules, N1 106 and N2 108 to indicate the normal operation of the network modules or to synchronize the modules as needed. The active CI MGR CPU 120 and its associated CI MGR 118 in N1 106 may run network management software that a network administrator 104 may use to configure and monitor servers 124-126 and the stacked network modules 106 and 108. The MGMT uplink port 110 may be connected to the management network 102. Each IN port 112 on a network module, e.g., N1 106 and N2 108, may only be connected to an OUT port 114 on a neighbor network module, e.g., N2 108 and N1 106. Herein, network modules, e.g., N1 106 and N2 108, connected to ports 112 and 114 of neighboring network modules are described as being stacked with the neighboring modules.

Software for operating the network modules, N1 106 and N2 108, may be stored within a memory module 128 in each network module, N1 106 and N2 108. The software may direct the CPU, e.g., C1 MGR CPU 120, to use Link Layer Discovery Protocol (LLDP) to determine that the IN port 112 and OUT ports 114 of the network module N1 106 are connected properly, e.g., to the OUT port 114 and the IN port 112, respectively, on network module N2 108. A network module 106 may also send and receive LLDP data through a MGMT uplink port 110 to verify that it is not connected to another MGMT port 110 and determine if it is connected to a management switch 130. A management switch 130 may have LLDP, network discovery protocol (NDP) enabled or disabled, and may also send and receive other types of packets that indicate whether or not the MGMT uplink port 110 is connected to a management network 102. In one example, the NDP is Cisco Discovery Protocol (CDP). In addition to the above mentioned protocols and packets, a network module N1 106 may also monitor for spanning tree protocol (STP) packets and determine if they are valid packets from a switch. Each network module, e.g., N1 106 and N2 108, may also contain a network controller CPU 132 to execute network module protocols and network packet analysis. Each network controller CPU 132 may be attached to a serial port 134 to provide an interface through which data may travel.

Each network module 106 and 108 may additionally contain a network switch 136. Each network switch 136 may communicatively connect a network module 106 to servers 124-126. Within the network modules 106 and 108, as well as within the servers 124-126 shown in FIG. 1A, a number of network interface cards (NIC) 138 connect components to other components in the network. Likewise, each CI MGR 118 and each server 124-126 may include an integrated lights out module (iLO) 140. As used herein, an iLO 140 module may use any management technology that allows an administrator to monitor and manage the networked devices incorporating an iLO modules is incorporated in, regardless if the device is powered on or not. In one example, the iLO is the proprietary HP server management technology by the same name, however in other examples, other out-of-band management technologies may also be implemented. Each server 124-126 may further be connected to a server switch 142, which communicatively connects each server 124-126 to the management network 102. In some examples, the server switch 142 is a computer networking device that performs packet switching between each of the devices and networks connected to it.

In addition to the software stored in each memory module 128, each memory module 128 may also contain a bridge ID module 144, a priority adjustor module 146, and a root designator module 148. The bridge ID module 144 may store a bridge ID value. The priority adjustor module 146, may adjust the bridge ID stored in the bridge ID module 608 value based on connectivity conditions and may also be based in part upon a MAC address. The root designator module 148 may designate root status to a network module if the bridge ID value stored in the bridge ID module 608 is the lowest when compared to the bridge ID values of other stackable network modules. The root designator module 148 may also designate root status based on a MAC address if the bridge ID values between all stacked network modules N1 106 and N2 108 are the same. Based on the designated root status of a network module N1 106 or N2 108, a MGMT uplink port 110 may be enabled.

Figure 1B:
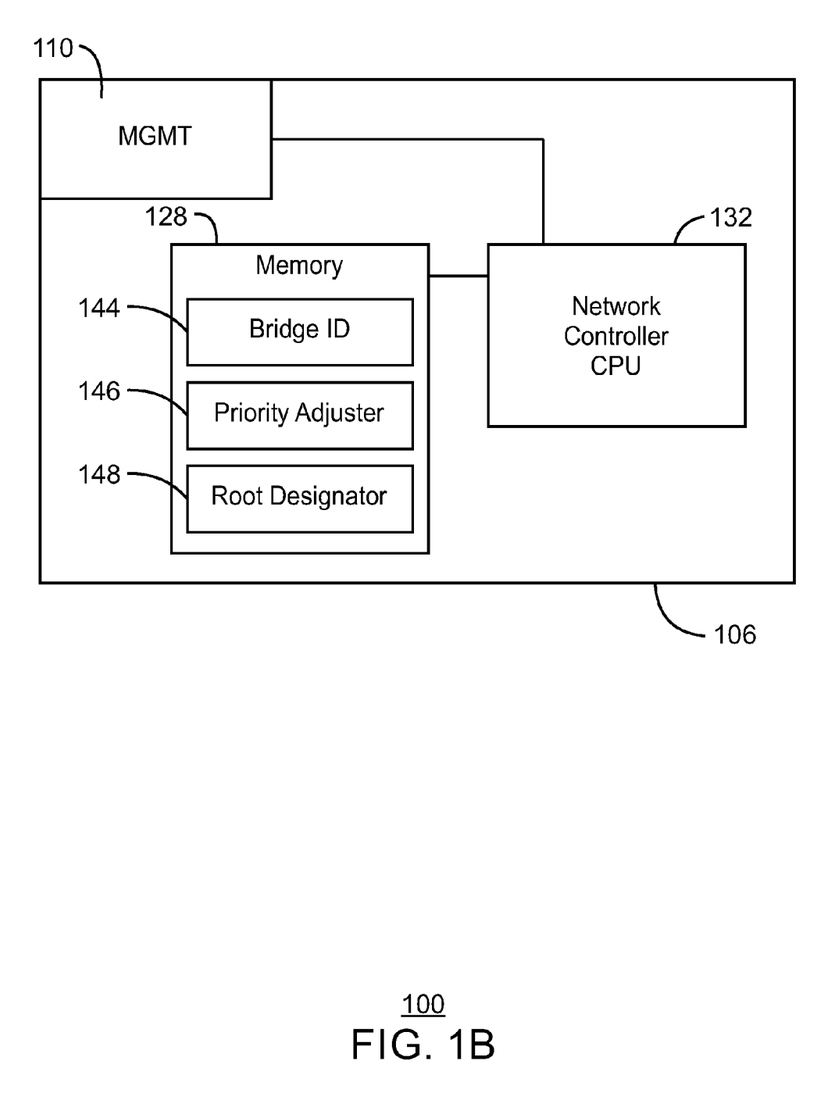

FIG. 1B shows a simplified block diagram of an example stackable network module 106. Like numbered items are as described with respect to FIG. 1A. The stackable network module may include a memory module 128, a network controller CPU 132, and a MGMT uplink port 110. The memory module 128 may include a Bridge ID module 144 which may store a bridge ID value based on a bridge priority value and a MAC address. The memory module 128 may also include a priority adjuster module which may lower the stored Bridge ID value based on connectivity conditions. The root designator module 148 may designate root status to the network module 106 if the bridge ID stored in the bridge ID module 144 is lower than other stackable modules that may be stacked with the stackable network module 106. If the root designator module 148 has designated the stackable network module 106 as the root module, the MGMT uplink port 110 connected to the network controller CPU 132 may be enabled.

Figure 2:
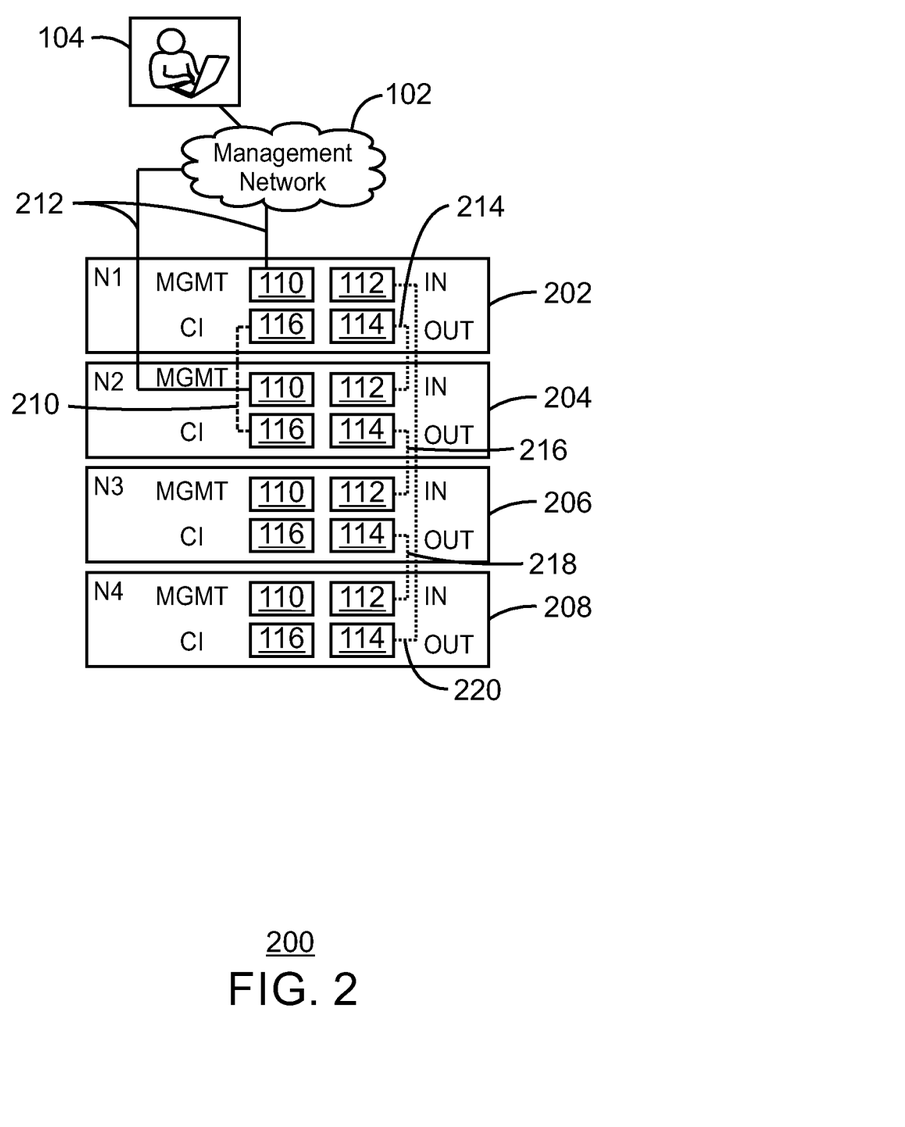
FIG. 2 is a block diagram of an example network including stacked network modules connecting to a management network.

FIG. 2 is a block diagram of a network 200 including stacked network modules connecting to a management network 102. Like numbered items are as described with respect to FIG. 1A. Each of the network modules 202-208, may have a MGMT port 110 that is connected to the management network 102. For simplicity of explanation only network modules 202 and 204 are shown with a management uplink port 110 communicatively connected to the management network 102. Although both network modules 202 and 204 are communicatively connected to the management network through a respective MGMT uplink port 110 and an MGMT uplink cable 212, only one MGMT port 110 on a network module will be enabled to the management network from the network modules 202-208.

As described with respect to FIG. 1A, each of the network modules 202-208 may have three additional ports including, for example, an IN port 112, an OUT port, 114, and a CI port 116. An example of the connections that may be used between the ports 110-116 is illustrated in FIG. 2 with the cables and uplinks pictured. The different style of each connection pictured does not necessarily indicate a different medium is facilitating the connection, but is instead varied to assist in identifying the different ways the ports may be connected. For example, a CI cable 210 connects the CI ports 116 of network modules 202 and 204, and allows the two network modules to share heartbeat information. Although network modules 202 and 204 are connected, not all of the network modules 202-208 need to be connected by their CI ports 116 to remain stacked. For example, the stacking of network modules 202-208 depends more upon the interconnections provided by their connections to all other modules through the IN ports 112, OUT ports 112, and stacking cable. As pictured, each of these ports connect so that all network modules are connected in the collection of modules to each other, however no additional connection loops are formed between network modules by their IN and OUT ports. Here module N1 202 connects the OUT port 114 to the module N2 204 IN port 112 via a stacking cable 214. Similar connections are made between the OUT ports 114 and IN ports 112 for the remaining modules with stacking cable 216, 218, and 220 respectively. Each network module IN port 112 is only connected to one other network module's OUT port 114.

Figure 3A:
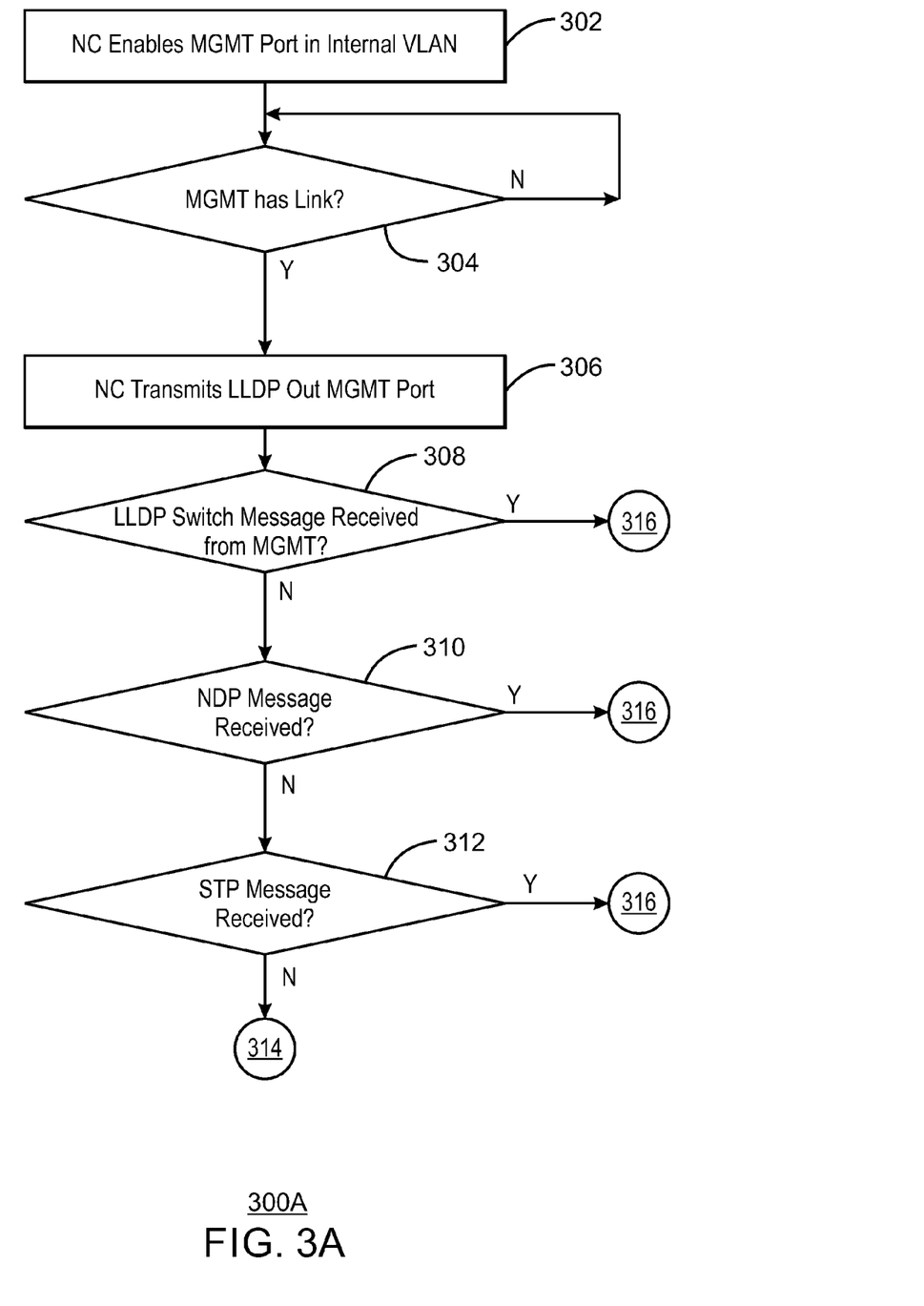
FIG. 3A and FIG. 3B are block diagrams of an example method for determining which management uplink to a management network should be enabled from a number of stacked network modules.
Figure 3B:
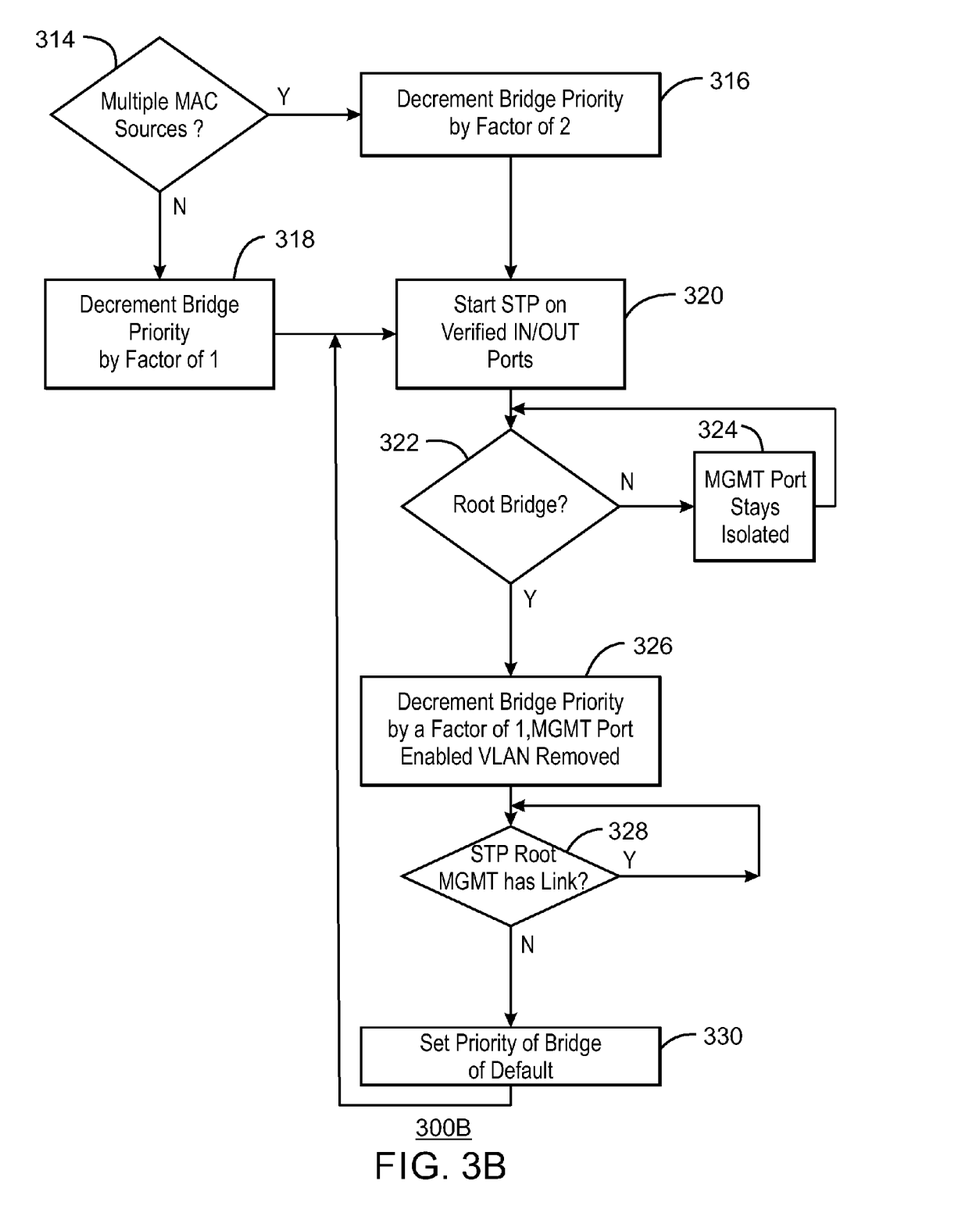

FIG. 3A and FIG. 3B are block diagrams of an example method 300 for determining which management uplink to a management network should be enabled from a number of stacked network modules. At block 302 a network module (NM) places its own MGMT uplink port in an internal virtual local area network (VLAN). Placing the MGMT uplink port in an internal VLAN will have the effect that any broadcast traffic received by the network module may not be transmitted out, but only analyzed within the network of stacked network modules. Broadcast traffic may include any data. In one example, broadcast traffic is in the form of data packets. At block 304 the network module will determine if the MGMT uplink port is connected to the management network. If the MGMT uplink port is connected to the management network, the method continues to block 306. If the MGMT uplink port is not connected to the management network, then process flow returns to block 304 to continue to periodically check for a connection between the MGMT uplink port and management network. At block 306 the network module may transmit LLDP data from its MGMT port. At blocks 308-314, the received broadcast traffic is analyzed. The analysis may include determining if the broadcast traffic includes valid packets from a switch. At block 308 the network module determines if a received message is an LLDP switch message from a MGMT uplink port. If yes, then process flow proceeds to block 316. If the message is not an LLDP switch message from a MGMT uplink port, then the analysis continues at block 310. At block 310 the network module determines if a received message is a network discovery protocol (NDP) message. In one example the network discovery protocol is the Cisco Discovery Protocol (CDP). If yes, then process flow proceeds to block 316. If the message is not a NDP message, then the analysis continues at block 312. At block 312 the network module determines if a received message is a spanning tree protocol (STP) message. If yes, then process flow proceeds to block 316. If the message is not a NDP message, then the analysis continues at block 314. At block 314 the network module may determine if received messages are associated with different source MAC addresses. The network module's determination may include checking a switch forwarding database (fdb). If the fdb has multiple source MAC addresses related to one MGMT port, the port may be connected to a switch. If yes, the received messages are associated with different source MAC addresses, the process flow proceeds to block 316. If the messages do not contain multiple source MAC addresses, then process flow continues at block 318. In some examples, the MGMT port of the network module may be connected to a management switch that has LLDP disabled. If LLDP or network discovery protocol (NDP) is disabled at the management switch the network module must monitor for other types of packets to determine if the MGMT port is connected to a management network.

At block 316, the bridge priority value stored in a memory region of the network module is decremented by a factor of 2. Decrementing a bridge priority value by a factor of two may be used to indicate that the management port of the network module is connected to a switch. A connection to a switch may be detected by a network modules through the receipt of an LLDP message, CDP message, STP message, or by the detection of multiple MAC addresses. Process flow then proceeds to block 320. At block 318, the bridge priority value stored in a memory region of the network module is decremented by a factor of 1. Decrementing a bridge priority value by a factor of one may be used to indicate that the management port of the network module is properly connected. It has verified that it is not incorrectly connected to an IN, OUT, or another MGMT port. However, decrementing a bridge priority value by a factor of one also indicates that the network module is unable to give confirmation of a connection to a switch.

At block 320, after each network module has determined the IN, OUT, and MGMT ports are connected properly, the network modules will run spanning tree protocol (STP) to verify that the stacked network modules are loop free. STP is run on the verified IN and OUT ports in the network of stacked network modules. It is the MGMT port connectivity of the network module that primarily determines the root bridge that is to be used in STP across the network of stacked network modules. STP may require the designation of a root bridge to run properly and when applied to multiple ports in a network of stacked network modules can break loops between those ports. The root designation may be assigned to the network module with the lowest Bridge ID. In one example, the MGMT uplink port does not participate in the STP. Rather, the MGMT uplink port may only be responsible for setting the bridge priority value as seen at blocks 316 and block 318.

At block 322 a network module determines if it has the root bridge designation. If not, process flow proceeds to block 324. If the network module has the root designation process flow proceeds to block 326. At block 324, the MGMT uplink of the network module remains isolated and the process for this isolated network module does returns to block 322. The isolated network module stays isolated unless it gains root status. At block 326, the bridge priority value is decremented by a factor of 1, the MGMT uplink port is enabled, and the isolating VLAN is removed. The removal of the VLAN enables the MGMT uplink port to freely transmit and receive data with the management network. Thus, if the network module has been determined to have root designation, the network module will enable the MGMT port for normal traffic.

At block 328, the MGMT uplink port of the network module with the root designation, is continuously monitored to determine if is communicatively linked to the management network. If yes, then process flow returns to block 328, to periodically perform the check until the MGMT uplink port of the root network module loses its link to the management network.

If it is determined that the MGMT uplink port of the root network module no longer has a communicative link to the management network, the method proceeds to block 330. At block 330, the network module with the root designation resets the bridge priority value to the default value. After the default value is reset, the process flow returns to block 320 in order to reassign a root designation to a network module in light of the lost link to the management network, and the updated bridge priority values of the network module.

Figure 4A:
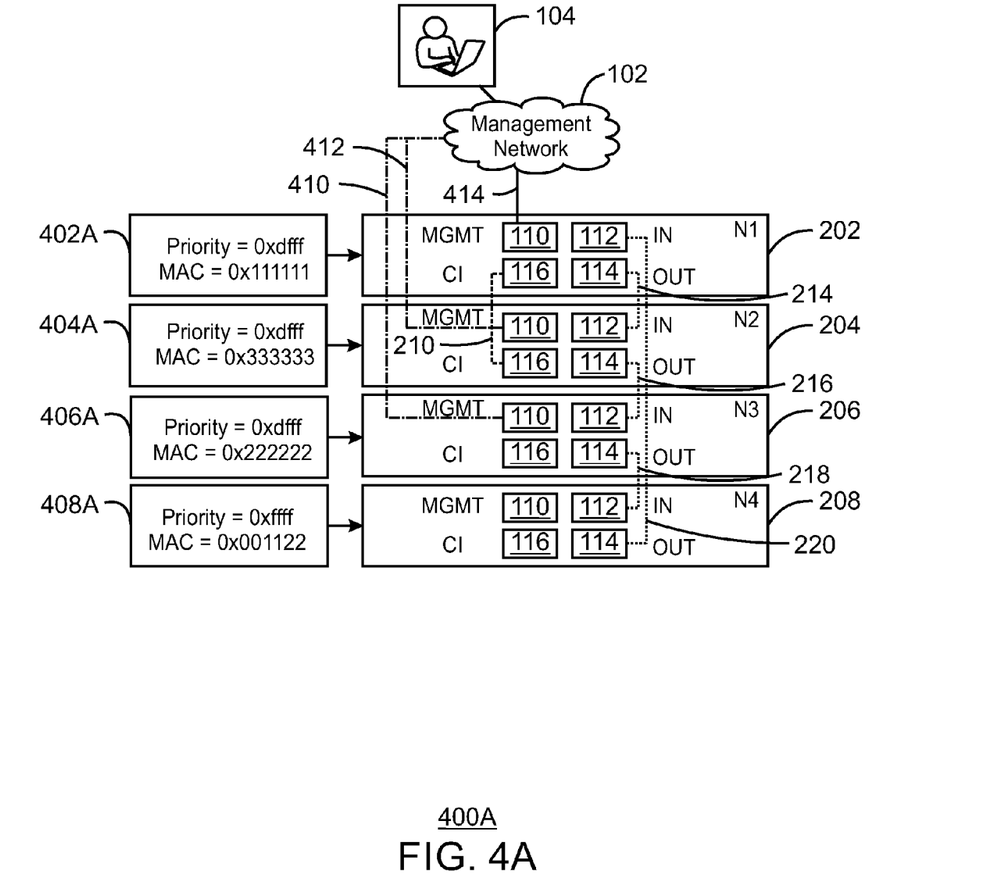
FIGS. 4A and 4B show example stacked network modules and their bridge priority values and examples of MAC addresses before, in FIG. 4A, and after, in FIG. 4B, the pulling of an enabled active management uplink port from a management network.
Figure 4B:
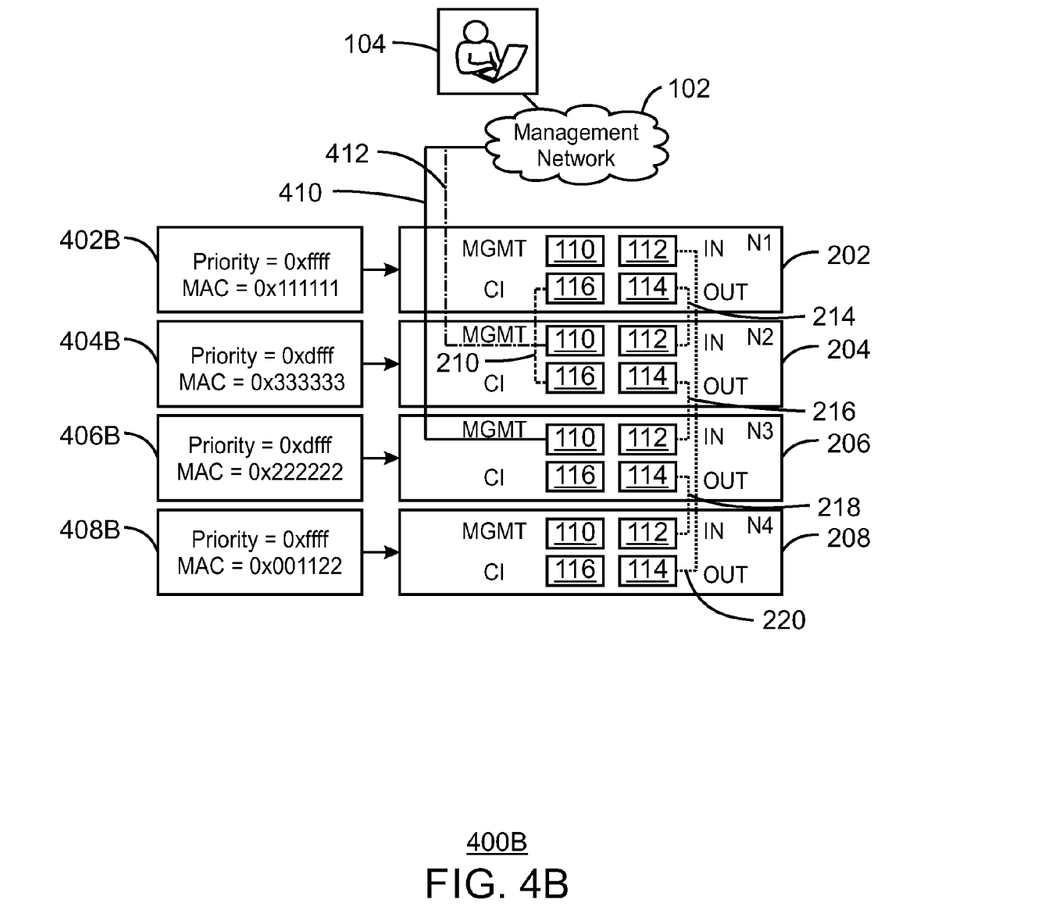

FIGS. 4A and 4B show example stacked network modules and their bridge priority values and examples of MAC addresses before, in FIG. 4A, and after, in FIG. 4B, the pulling of an enabled active management uplink port from a management network. Like numbered items are as described with respect to FIG. 2. Pictured mac addresses are exemplary only. For example, while FIGS. 4A and 4B show 24 bit mac address, 48 bit addresses are also included as the exact format of the mac address is not limited by this disclosure. FIG. 4A additionally shows associated bridge priority values and MAC values 402a-408a for each of the network modules 202-208. As described with respect to blocks 306-318 of FIG. 3, the bridge priority value may be adjusted based on its connectivity conditions. One way this is visualized in FIG. 4 can be seen in the fact that the bridge priority value and MAC address of network module N1 202 differs from the values for N2 204, N3 206, and N4 208. Network modules are given differing bridge priority values as more fully explained and implemented by the method described with respect to FIG. 3. However, one aspect that is visualized in FIG. 4A shows that the bridge priority value difference is due at least in part to the lack of a communicable connection between the MGMT uplink port 110 of N4 208 and the management network 102.

In the example shown in FIG. 4A, only one MGMT uplink port 110 is enabled and active at a time. In FIG. 4A, the MGMT uplink ports 110 of N2 204 and N3 206 are shown as disabled, or inactive even though each of these MGMT uplink ports 110 has a communicative connection to the management network 102. This is seen through the deactivated uplink connections 410 and 412. In one example, the MGMT uplink ports 110 of N2 204 and N3 206 are isolated in a VLAN as described with respect to FIG. 3. These MGMT uplink ports 110 contrast with the MGMT uplink port 110 of N1 202 which is not disabled, but instead is an active and enabled connection to the management network to the MGMT 102. This is seen through the active uplink connection 414 between the management network 102 and the MGMT uplink port 110 of network module N1 202. The network module N1 202 is "active" as it has been given the root designation. It is worth noting that even though the bridge priority values of N1 202, N2 204, and N3 206 are the same, N1 202 has the lowest MAC value, and will accordingly have the highest Bridge ID value & root designation.

In FIG. 4B, it may be assumed that the communicative connection between the MGMT uplink port 110 of N1 202 and the management network 102 has been lost. Accordingly, FIG. 4B may illustrate the process starting at block 328 of FIG. 3B. In this example, when the network module 202 with root designation loses a connection to the management network 102, the bridge priority value of that network module may be adjusted and a new root designation assigned. The bridge priority value 402b may be adjusted as it becomes the default value. This value may be the same as the bridge priority value 408b of the N4 208 because both network modules no longer have a communicative connection to the management network 102.

Further, in this example, the root designation has already been reassigned to N3 206 and the VLAN on its MGMT uplink port 110 has been removed, allowing normal traffic to the management network 102. Accordingly, network module N3 206 has an active uplink connection 410 to the management network 102. By contrast, network module N2 204 still has a disabled uplink connection 412. The reassignment and of root designation and enabling of MGMT uplink ports is discussed in more detail with respect to blocks 330 and 320-322 of FIG. 3. In one example, the recalculation is by the STP. Again, in FIG. 4B, because bridge priority values are equal between N3 206 and N2 204, the lower MAC address will become the root bridge based the resulting higher bridge ID.

Figure 5:
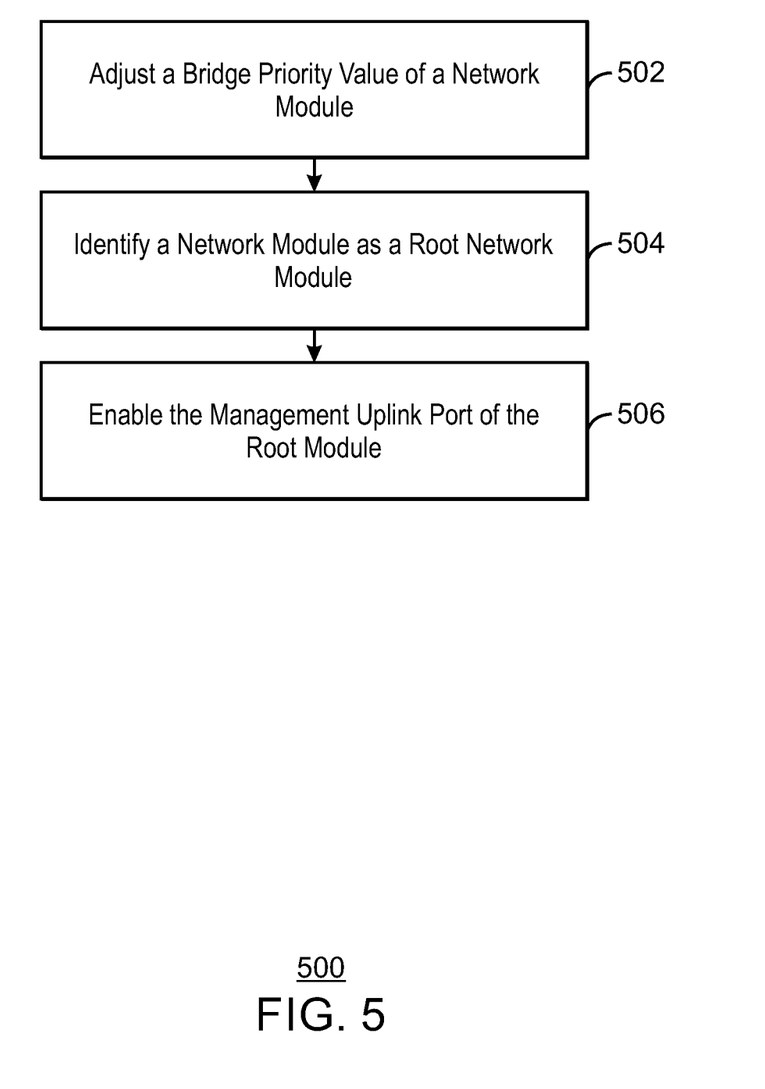
FIG. 5 is a block diagram of an example method for determining which management uplink of a network module uplink should be enabled from a number of stacked network modules.

FIG. 5 is a block diagram of an example method for determining which management uplink of a network module uplink should be enabled from a number of stacked network modules. The method begins at block 502, where the bridge priority value is adjusted based on connectivity conditions. The adjustment may be to a lower or higher value depending on the system conventions. However, the end result of the adjustment is to lower the Bridge ID, which is a value used to assign the root designation. A Bridge ID is a value that combines the information about the bridge priority value and the MAC address of a particular network module and synthesizes it to generate an overall Bridge ID value for use as a way of determining a network module best suited to be give root designation. Each of these values is saved to a memory region on the network modules and the adjusted values are resaved after each adjustment. Connectivity conditions include detectable conditions about the connection state of the network module, such as if it has a communicable connection to the management network. Other connectivity conditions may include its connections and connection quality to other stacked network modules.

At block 504, a network module is identified as a root network module if it has a lower Bridge ID than all other stacked network modules, where the Bridge ID is based on the bridge priority value and a MAC address stored in a memory region. At block 506, the management uplink port of the root network module is enabled to actively manage data between the management network and other stacked network modules.

Figure 6:
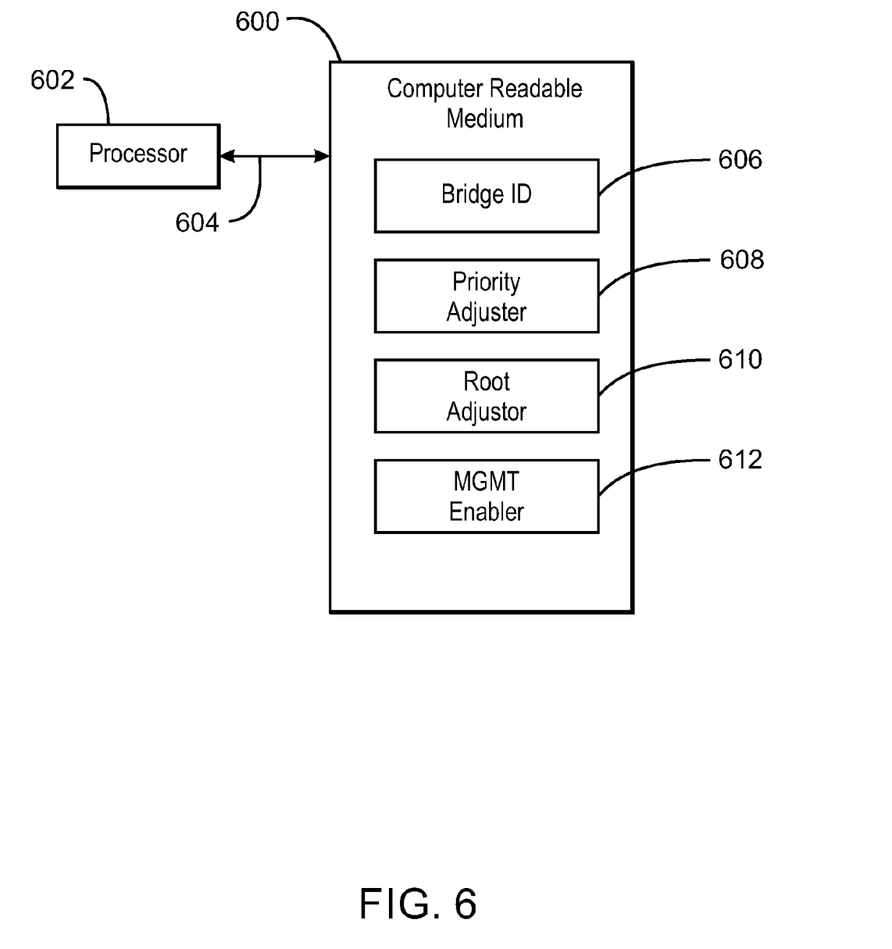
FIG. 6 is a block diagram of an example non-transitory computer readable medium 600 for determining a management uplink in a stackable network module.

FIG. 6 is a block diagram of an example non-transitory computer readable medium 600 for determining a management uplink in a stackable network module. The computer readable medium may be connected to a process 602 by a bus 604. The processor 602 may be a single core processor, a multi-core processor, a computing cluster, or any number of other configurations. The bus 604 may link and allow the transmission of data between the processor 602 and the computer readable medium 600. The computer readable medium 600 may be a non-transitory computer readable medium, a storage device configured to store executable instructions, or any combination thereof. In any case, the computer-readable medium 600 is not configured as a wave or signal.

The computer readable medium 600 may include a bridge ID module 606, a priority adjustor module 608, a root assigner module 610, and a MGMT enabler module 612. The bridge ID module 606 may store a bridge ID value. The priority adjustor module 608, may adjust the bridge ID stored in the bridge ID module 606 value based on connectivity conditions and may also be based in part upon a MAC address. The root assigner module 610 may assign root status to a network module if the bridge ID value stored in the bridge ID module 606 is the lowest when compared to the bridge ID values of other stackable network modules. The root assigner module 610 may also assign root status based on a MAC address if the bridge ID values between all stacked network modules are the same. The MGMT enabler module 612 may enable the management uplink port of the network module if the network module has had root status assigned to it.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

The invention claimed is:

1. A method for determining an active management uplink comprising:

adjusting a bridge priority value, based on connectivity conditions, to lower the value of a bridge ID stored in a memory region of a network module;

identifying a network module as a root network module if it has a lower bridge ID than all other stacked network modules, where the bridge ID of a network module is based on the bridge priority value and a MAC address stored in a memory region of the network module; and enabling the management uplink port of the root network module to actively manage data between the management network and other stacked network modules.

2. The method of claim 1, comprising:

transmitting a link layer discovery protocol (LLDP) message from a network module; and evaluating, as connectivity conditions, the receipt of an LLDP switch message from the management network, a network discovery protocol (NDP) packet, a spanning tree protocol (STP) packet, or any combination thereof.

3. The method of claim 1, comprising running STP across the stacked network modules to eliminate loops between each of the stacked network modules and the management network.

4. The method of claim 1, comprising reassigning which network module should be identified as the root network module when the active management uplink to the management network loses its ability to communicate with the management network.

5. The method of claim 4, comprising basing the reassigning of a root designation on a bridge ID.

6. The method of claim 4, comprising adjusting the value of the bridge priority value of a network module which loses its ability to communicate with the management network so that the network module's Bridge ID value is lower.

7. The method of claim 1, comprising communicating between stacked network modules with an input and output port on each network module.

8. The method of claim 1, comprising isolating a network module in a VLAN until the management uplink port of the root network module is enabled.

9. A stackable network module comprising:
a processor;
a memory comprising:
 a bridge ID comprising:
  a bridge priority value; and
  a MAC address; and
 code configured to direct the processor to:
  adjust the bridge priority value, based on connectivity conditions, to lower the bridge ID; and
  designate the network module as a root network module if the network module has a lower bridge ID than all other stacked network modules; and
a management port with an uplink to a management network that is enabled when the networking module is designated as the root network module.

10. The stackable network module of claim 9, wherein the memory comprises code to direct the processor to:
transmit a link layer discovery protocol (LLDP) message from the management port; and
evaluate connectivity conditions based on if the network module has received an LLDP switch message from the management network, a network discovery protocol (NDP) packet, a spanning tree protocol (STP) packet, or any combination thereof.

11. The stackable network module of claim 9, comprising input and output ports for connecting and communicating with other stackable network modules.

12. The stackable network module of claim 11, wherein the memory comprises code configured to direct the processor to run STP across all connected stackable network modules to eliminate loops between the stacked network modules and the management network.

13. The stackable network module of claim 11, wherein the memory comprises code configured to direct the processor to:
remove a root designation from a network module when a communicative connection between the management network and the network module is lost;
lower bridge ID of by adjusting its bridge priority value if the network module loses a communicative connection to the management network; and
reassign the root designation to another of stackable network modules based on a bridge ID.

14. The stackable network module of claim 9, comprising a mobile device.

15. A non-transitory machine readable medium having instructions stored thereon that when executed by a processor, direct the processor to:
adjust a bridge priority value, based on connectivity conditions, to decrease a Bridge ID associated with the bridge priority value and stored in a memory of a network module;
assign root status to the network module with a management uplink port that connects to the management network and has the lowest Bridge ID among connected network modules, where the Bridge ID is based on the bridge priority value and a MAC address of each network module; and
enable the management uplink port of the network module with root status.

16. The non-transitory machine readable medium of claim 15, comprising code configured to direct the processor to:
transmit a link layer discovery protocol (LLDP) message from the management port of a network module prior to assigning root status; and
evaluate, as connectivity conditions, the receipt of an LLDP switch message, receiving a network discovery protocol (NDP) packet, a spanning tree protocol (STP) packet, packets with different MAC addresses, or any combination thereof.

17. The non-transitory machine accessible storage medium of claim 15, comprising a network module with input and output ports for communicating between other stacked network modules.

18. The non-transitory machine accessible storage medium of claim 17, comprising code configured to direct the processor to run a spanning tree protocol to eliminate loops between the stacked network modules and the management network.

19. The non-transitory machine accessible storage medium of claim 17, comprising instructions to direct a processor to:
remove root status designation from a network module when a communicative connection to the management network is lost;
lower a network module's bridge ID by adjusting a network module's bridge priority value when the network module loses a communicative connection to the management network; and
reassign the root status designation to another of the stacked network modules based on a bridge ID.

20. The non-transitory machine accessible storage medium of claim 15, comprising instructions to direct a processor to isolate the network module in a VLAN until the management uplink port of the network module is enabled.

* * * * *